United States Patent
Dovrtel et al.

(10) Patent No.: US 12,455,900 B1
(45) Date of Patent: Oct. 28, 2025

(54) METHOD FOR EXECUTING A QUERY IN A MULTI-DIMENSIONAL DATA SPACE USING VECTORIZATION AND A RELATED SYSTEM

(71) Applicant: QEngine LLC, Lakeland, FL (US)

(72) Inventors: Michael Dovrtel, Brno (CZ); Vaclav Dovrtel, Troskotovice (CZ); Vladimir Havlena, Cerna Hora (CZ)

(73) Assignee: QENGINE LLC, Lakeland, FL (US)

( * ) Notice: Subject to any disclaimer, the term of this patent is extended or adjusted under 35 U.S.C. 154(b) by 99 days.

(21) Appl. No.: 18/598,638

(22) Filed: Mar. 7, 2024

Related U.S. Application Data

(60) Provisional application No. 63/488,785, filed on Mar. 7, 2023.

(51) Int. Cl.
*G06F 16/28* (2019.01)
*G06F 16/22* (2019.01)
*G06F 16/2455* (2019.01)

(52) U.S. Cl.
CPC ........ *G06F 16/283* (2019.01); *G06F 16/2237* (2019.01); *G06F 16/2455* (2019.01)

(58) Field of Classification Search
CPC . G06F 16/283; G06F 16/2237; G06F 16/2455
USPC ....................................................... 707/600
See application file for complete search history.

(56) References Cited

U.S. PATENT DOCUMENTS

| | | |
|---|---|---|
| 5,884,299 A | 3/1999 | Ramesh et al. |
| 6,182,061 B1 | 1/2001 | Matsuzawa et al. |
| 6,865,567 B1 | 3/2005 | Basantkumar et al. |
| 7,272,612 B2 | 9/2007 | Birdwell et al. |
| 7,376,656 B2 | 5/2008 | Blakeley et al. |
| 8,090,751 B2 | 1/2012 | Saffer et al. |
| 8,374,986 B2 | 2/2013 | Indeck et al. |
| 8,660,980 B2* | 2/2014 | Herzog ............... G06F 18/2414 706/52 |
| 9,411,853 B1 | 8/2016 | Dovrtel et al. |
| 9,952,894 B1 | 4/2018 | Cappiello |
| 10,095,759 B1 | 10/2018 | Cappiello |
| 10,191,963 B2 | 1/2019 | Shen et al. |
| 10,255,320 B1 | 4/2019 | Cappiello |
| 10,628,418 B2 | 4/2020 | Weyerhaeuser et al. |
| 10,846,318 B1 | 11/2020 | McNabney et al. |
| 10,956,380 B2 | 3/2021 | Tran et al. |
| 10,990,598 B2 | 4/2021 | Pham et al. |
| 11,195,050 B2 | 12/2021 | Abhyanka et al. |

(Continued)

FOREIGN PATENT DOCUMENTS

| | | |
|---|---|---|
| EP | 2469423 | 9/2019 |
| WO | WO2004040447 | 5/2004 |

*Primary Examiner* — Joshua Bullock
(74) *Attorney, Agent, or Firm* — Allen, Dyer, Doppelt + Gilchrist, PA

(57) ABSTRACT

A method is for executing a query in a multi-dimensional data space. The method includes performing operations with source data on an atomic level of the multi-dimensional data space, performing a mapping data operation on data from the operations, and performing a map consolidation operation on the mapped data from the operations. The method also includes performing a map-reduce operation on the mapped data from the operations, the map-reduce operation including sequential vectorized operations, and generating a result for the query based upon the sequential vectorized operations.

20 Claims, 14 Drawing Sheets

(56) References Cited

U.S. PATENT DOCUMENTS

| | | | |
|---|---|---|---|
| 11,250,107 | B2 | 2/2022 | Piveteau et al. |
| 11,281,683 | B1 | 3/2022 | Shackell |
| 11,354,324 | B1 | 6/2022 | Shackell |
| 11,386,085 | B2 | 7/2022 | Ojha et al. |
| 11,475,003 | B1 | 10/2022 | Shackell |
| 11,481,378 | B1 | 10/2022 | Shackell |
| 11,567,952 | B2 | 1/2023 | Idreos et al. |
| 11,567,965 | B2 | 1/2023 | Liao et al. |
| 11,573,927 | B1 | 2/2023 | Pearson et al. |
| 11,580,105 | B2 | 2/2023 | Pearson et al. |
| 11,614,970 | B2 | 3/2023 | Huang et al. |
| 2002/0029207 | A1 | 3/2002 | Bakalash et al. |
| 2006/0155915 | A1 | 7/2006 | Pereira |
| 2008/0040348 | A1 | 2/2008 | Lawande et al. |
| 2011/0153548 | A1 | 6/2011 | Varghes et al. |
| 2012/0011144 | A1 | 1/2012 | Transier et al. |
| 2012/0047126 | A1 | 2/2012 | Branscome et al. |
| 2013/0031053 | A1 | 1/2013 | Tobin et al. |
| 2017/0039232 | A1 | 2/2017 | Jayanth et al. |
| 2017/0075964 | A1 | 3/2017 | Greene et al. |
| 2017/0139746 | A1 | 5/2017 | Maier et al. |
| 2018/0349423 | A1* | 12/2018 | Srinivasulu ............ G06F 16/172 |
| 2021/0256006 | A1* | 8/2021 | Zhang ................... G06F 16/244 |
| 2022/0414470 | A1* | 12/2022 | Nojavanasghari ... G06N 3/0985 |

\* cited by examiner

METHOD FOR EXECUTING A QUERY IN A MULTI-DIMENSIONAL DATA SPACE USING VECTORIZATION AND A RELATED SYSTEM

RELATED APPLICATION

This application is based upon prior filed copending Application No. 63/488,785 filed Mar. 7, 2023, the entire subject matter of which is incorporated herein by reference in its entirety.

TECHNICAL FIELD

The present disclosure relates to the field of data processing, and, more particularly, to processing data in a multi-dimensional data space and related methods.

BACKGROUND

Business Intelligence (BI) analysis of very large data (i.e., "big data") and a rapidly increasing number of users are presenting challenges for BI vendors, as well as database engine vendors. Traditional hardware concepts, such as row-based databases and multi-dimensional on-line analytical processing (OLAP) approaches utilizing current hardware do not provide sufficient speed and scalability to respond to current BI challenges, and thus a need exists. By way of example, there is a need for speed and flexibility in ad hoc reporting, big data analysis, scalability in terms of number of concurrent users, and processing complexity of business data models in a current dynamically changing environment.

For example, U.S. Pat. No. 9,411,853 to Dovrtel et al. ('853 patent), which discloses a computer-implemented method for executing a query of a multi-dimensional data space, the entire contents of which are hereby incorporated by reference in their entirety. The method comprises storing source data in a data repository, forming a data cluster representing a multi-dimensional data space. The data is vertically and horizontally partitioned to form a mesh of data chunks for processing of the data in a fully distributed environment. The method includes storing the data chunks as standard files using a standard computer file system, and presenting the data chunks in several versions simultaneously for enabling concurrent execution of queries with different versions of the data repository. The method includes among other things organizing queries to an acyclic directed graph.

SUMMARY

Generally, a method is for executing a query in a multi-dimensional data space. The method comprises performing a plurality of operations with source data on an atomic level of the multi-dimensional data space, performing a mapping data operation on data from the plurality of operations, and performing a map consolidation operation on the mapped data from the plurality of operations. The method also includes performing a map-reduce operation on the mapped data from the plurality of operations, the map-reduce operation comprising sequential vectorized operations, and generating a result for the query based upon the sequential vectorized operations.

In some embodiments, the sequential vectorized operations may comprise performing parallel speculative preparation of fact value vectors having values for every relation that is part of input atomic data attributes, and storing attribute value comparison in mask vectors. The map consolidation operation may comprise a sorting of the data from the plurality of operations.

Also, the sorting may comprise an aggregation of row based data using indices. The sorting may comprise processing a plurality of buffers. The plurality of buffers may comprise a constraint buffer, an attribute buffer, and a fact buffer. The method may also include selecting the source data based upon at least one filter to generate filtered data. The mapping data operation may comprise dividing the data from the plurality of operations into a plurality of data chunks, and performing the mapping data operation on each of the plurality of data chunks. The mapping data operation, the map consolidation operation, and the map-reduce operation may be based upon just-in-time compilation, for example.

Another aspect is directed to a computing system for performing a method for executing a query in a multi-dimensional data space. The computing system comprises a processor and memory coupled thereto and configured to perform a plurality of operations with source data on an atomic level of the multi-dimensional data space, and perform a mapping data operation on data from the plurality of operations. The processor is also configured to perform a map consolidation operation on the mapped data from the plurality of operations, perform a map-reduce operation on the mapped data from the plurality of operations. The map-reduce operation comprises sequential vectorized operations. The processor is also configured to generate a result for the query based upon the sequential vectorized operations.

DETAILED DESCRIPTION

Figure 1A:
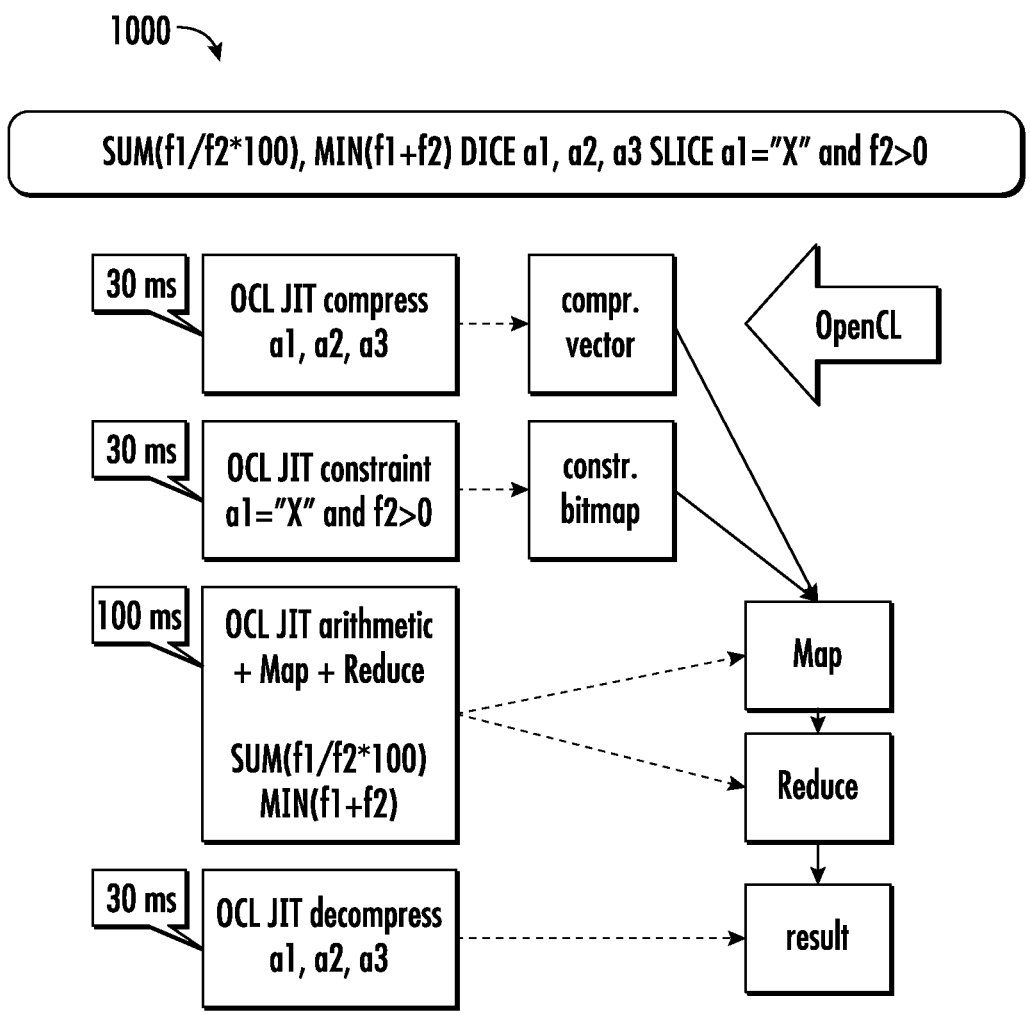
FIG. 1A is a schematic diagram of an aggregation engine, according to the prior art.

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

The present disclosure may provide an approach for a significant increase of the aggregation throughput and speed for BI analytical processing through the disclosed aggregation engine with the following features and benefits: 1. speed and flexibility upgrade in ad-hoc reporting; 2. supporting a larger number of small/midsize projects/clients sharing the same cloud; 3. scalability in terms of the number of concurrent users; 4. complexity of business data model in a current dynamically changing environment; and 5. speeding up report processing in multi-user and multi-project environments.

The summary of this invention is associated with a new version of the core aggregation engine that has been developed to take full benefits and features of the newest CPUs' hardware. As disclosed in the '853 patent, the aggregation logic was designed to utilize massive parallel hardware components of the traditional CPU generation, allowing the development of a special implementation of Map-Reduce. The optimized Map-Reduce concept was designed for aggregation tasks utilizing massive parallel processing in multiple CPU cores running in multithreaded mode.

During the last several years, chipmakers have been increasing the power of another type of parallelism-instruction-level parallelism. Together with the trend to increase the number of cores, the width of Single Instruction Multiple Data (SIMD) registers has also gradually increased. Therefore, a new approach for instruction-level parallelization has emerged under the "vectorization" name. Traditional processor registers have room to hold only a single value at a time, and traditional processor instructions operate on these single values or pairs of single values sequentially. The addition of special wide CPU registers for holding vectors of numerical values, along with instruction set extensions to support SIMD operations, has enabled a new type of parallelism in software-vectorization. Vectorization allows a CPU to operate on multiple pieces of data within one instruction at the same time.

A new upgraded platform has been designed for scalable cloud computation with separate dedicated virtual nodes for each of the major BI functions. Such a BI system with dedicated, role-based access, can run parallel data aggregation tasks not only in multi-threading mode of CPUs, but also operating on a set of values (i.e., a vector) at one time to get the highest possible performance from the latest generation of processors. Such performance can be uniquely utilized in BI for big data analysis as well as in other verticals, such as, for example, finance. For maximum performance and throughput, individual nodes in the cloud are assigned into their specialized roles. For the aggregation module, there are three nodes that are involved in the data aggregation process.

The first node is data aggregation. For example, multiple virtual nodes are each capable of processing data aggregation tasks on CPUs. Multiple Data Aggregation nodes can support scalability requirements for larger concurrent user communities while maintaining an excellent response time for ad hoc reporting. The second node is for metadata serving. For example, separate metadata nodes provide extra performance support for GUI applications to search for business metadata objects. With such a separation, there is no performance degradation on data aggregation nodes in a cloud computing platform, for example, the Inzata cloud, as available from the present application's assignee. The third node is communication and controlling. Here, REST communication and controlling tasks are processed on a separate (e.g., dedicated) node. This separation allows additional scalability to support a larger user base and hundreds of projects residing on the same cloud running on a set of dedicated nodes.

In an exemplary embodiment, a new approach to the BI report aggregation use case is provided by leveraging so-called In-Memory Aggregation (IMA) technology significantly supported by hardware-accelerated CPUs. However, this herein disclosed engine is leveraging a combination of both multi-threading and vectorization. Thus, this new dual hardware acceleration dramatically improves performance and scalability. The scale of those improvements is growing with each new generation of CPU hardware. As such, a desirable approach for the BI aggregation engine is based on the maximum utilization of the most current hardware resources of CPUs. The disclosed technology accelerates BI application performance by parallel execution of the compute-intensive tasks through all the available threads while performing multiple operations simultaneously. Typical scalar instruction sets would need to process each operation one step at a time. In contrast, SIMD vector instructions can perform several operations in parallel.

Overview

In particular, the new generation of aggregation engine takes full benefit from the multi-dimensional analytical environment as it was described in detail in the '853 patent. In such an approach, all the unique components and design concept of the disclosed aggregation engine remain the same (i.e., parallel and horizontal partitioning data structure of the data repository, concept of multiple multi-dimensional data projections, Analytical Query Language, Logical Query decomposition, etc.) and are also fully utilized by the herein disclosed aggregation engine (2GAE). A detailed description of all the associated components and multi-dimensional analytical concepts can be found in the '853 patent, the contents of which are hereby incorporated by reference in its entirety. Thus, this detailed description of the disclosed embodiments is focused solely on the unique features and design of the 2GAE.

The core concept of the physical task execution (utilized by 2GAE) is also based on the Map-Reduce aggregation model to benefit from parallel multithreaded execution with simultaneous vector operations, thus providing significantly better scalability and performance than the engine of the '853 patent. As with both the '853 patent engine and the 2GAE, there are several basic operational steps needed to ensure a complete data aggregation process within the multi-dimensional data space: (1) selection of the source data accordingly to the specified constraint (i.e., filter); (2) arithmetic operations and functions with the data on the atomic level of the source multi-dimensional data space; and (3) change of the dimensionality of the atomic level data to be able to project them to the target multi-dimensional data space.

The first two steps typically fall into Map phase and they cover a number of basic operations such as compression of attribute keys, generation of constraint bitmaps, filtering of the source records, data type casting, and arithmetic operations with source data on the level of original data space dimensionality. The third step is accomplished during the Reduce phase. The operation is a grouping of the fact data according to the values of the keys with the application of the aggregation function (e.g., SUM, MIN, MAX). The high-level comparison of both the '853 patent engine and the 2GAE concepts, illustrating a data aggregation example, is shown in diagrams 1000, 1100 of FIGS. 1A and 1B, respectively.

The illustrated schema uses the query example defined by the AQL language to represent the processing of an expression that defines data selection by a constrain "a1=X and f2>0"; two arithmetic operations "f1/f2*100" and "f1+f2"; and change of the dimensionality to "a1, a2, a3" (where "a1", "a2" and "a3" are source data attribute vectors and "f1" and "f2" are source data fact vectors) The first step of processing "µJIT compress" ensures compression of source attribute vectors "a1", "a2" and "a3" into a tuple as wide as can be processed in one operation using the vector operations of the given processor. The second step of processing "µJIT constraint" ensures computation of a bitmap for a given constrain ("a1=X and f2>0"), which will be transformed to a "map index" in the next step (will be used to select constrained data from the source data vectors in "Map" phases). The "µJIT arithmetic" (which is also part of the "Map" phase) computes intermediate vectors applying given expressions ("f1/f2*100" and "f1+f2") to constrained source data vectors. The "Map" phase then processes the intermediate vectors by the consolidation algorithm, described in the flowchart 1500 in FIG. 5. The "Reduce" phase ensures the projection of the atomic level data (represented by intermediate data vectors produced by the "Map" phase) to the target multi-dimensional data space. The "Reduce" phase is described in detail by flowcharts 1600 in FIG. 6A, 1700 in FIG. 6B, 1800 in FIG. 7A, 1900 in FIG. 7B and diagrams 2000 in FIG. 8, 2100 in FIG. 9. The latest processing step performs reverse decompression of compressed attribute tuples (created by the "µJIT compress" process and then consequently processed by "Map" and "Reduce" phases together with fact data vectors).

Vectorization

Figure 2:
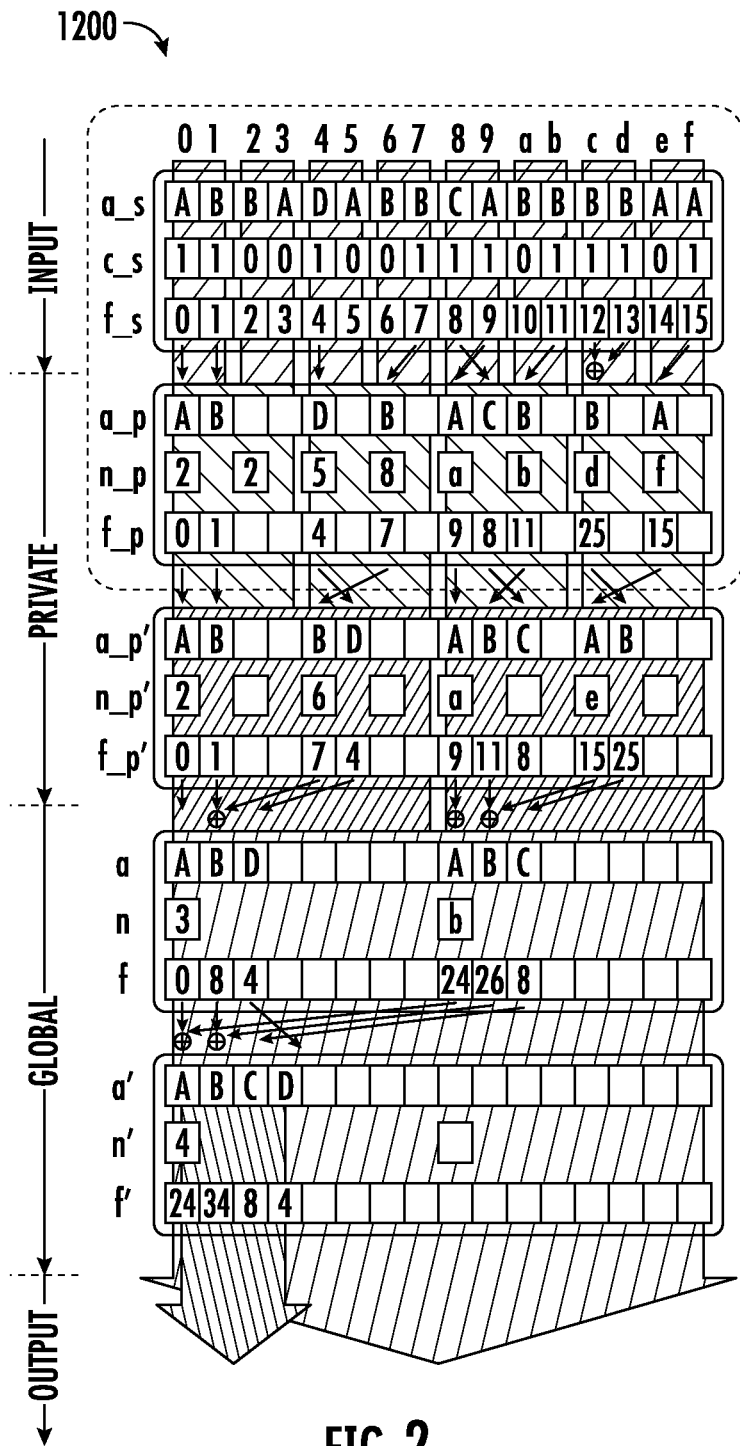
FIG. 2 is a schematic diagram of a structure of the data repository, according to the prior art.

The original Map-Reduce algorithm shown in diagram 1200 of FIG. 2 has been modified for the 2GAE to be optimized for the hardware acceleration of the current CPU to leverage multithreading and vectorization. In diagram 1200, the first few levels of reduction were implemented by a massively parallel approach (e.g., JIT compilation GPU architecture). The concept of reduction on lower granularity remains applicable even in new conditions (but using different approach to implementation).

Vectorization is the process of converting an algorithm from operating on a single value at a time to operating on a set of values (vector) at one time. Modern CPUs provide direct support for vector operations where a single instruction is applied to multiple data values (i.e., SIMD). For example, a CPU with a 512-bit register could hold 16 32-bit single precision values and do a single calculation up to 16 times faster than executing a single instruction at a time. The combination of the vectorization with the multithreading capability of CPUs leads to the orders of magnitude performance gains in optimization in the 2GAE.

Figure 4:
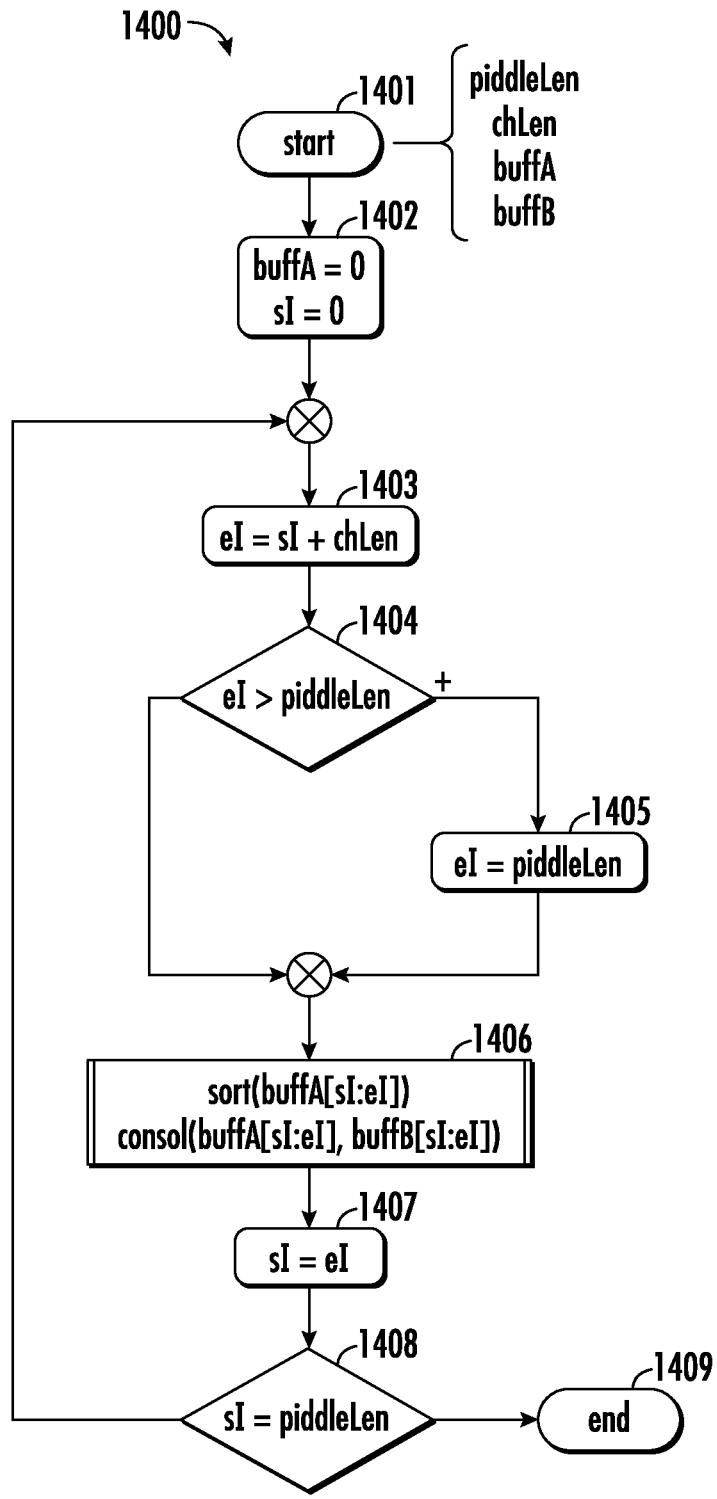
FIG. 4 is a flowchart of the mapping algorithm, according to the present disclosure.

The utilization of vectorization for data aggregation in BI industry is the unique approach used in the 2GAE technology. Vectorization has been used in the Map-Reduce process for reduction phases. In the Map phase, the entire data set is split into several distinct data chunks with a small number of elements (FIG. 4). The number of elements is set with concern to the effectiveness of the sorting algorithm that will be used for sorting the data.

Sorting Algorithm

Figure 3:
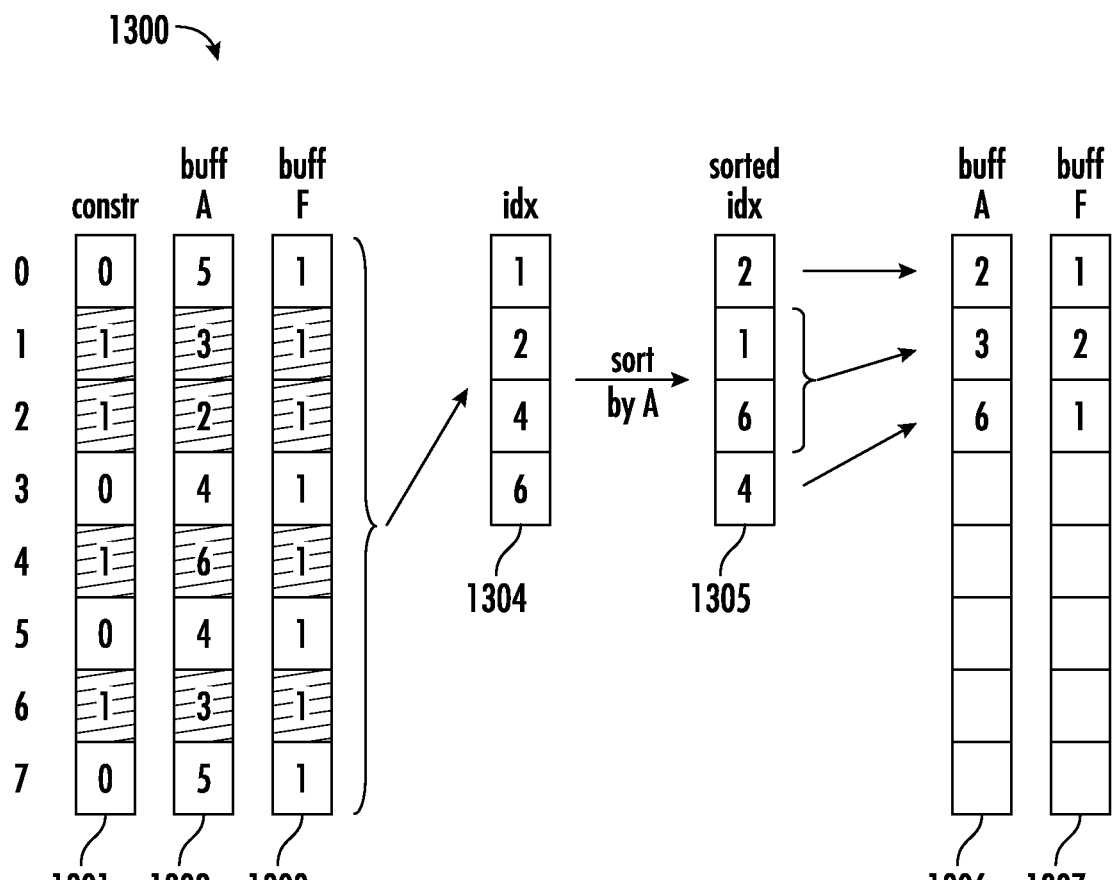
FIG. 3 is a schematic diagram of a mapping algorithm, according to the present disclosure.

Referring now to FIG. 3, the illustrated sorting algorithm is a new component in the 2GAE. During the first phase, the data for the aggregation process is selected using required filtering criteria. The "A" column 1302 indicates an attribute column; and the "F" column 1303 denotes a fact column of a data set. The "1" on the "constr" column 1301 indicates data rows selected to become a part of the aggregation process compatible with a given data set constraint, noted as the index column 1304. From such selected data, the sorted index column 1305 is created for sorting by the attribute "A".

Such a sorting task by its nature has a complexity of n log(n) level. This sorting task is one of the core operations of the whole upgraded aggregation process. Many performance measurements have been executed to determine the final optimal sorting algorithm. The final sorting algorithm has been selected even though it is not theoretically the optimal one according to its complexity level. Because sorting is executed over a small amount of data, the ultimate decision had to be made, whether sorting will be executed over the whole data set, or partially on smaller subsets of the whole report data sample.

According to the testing results, the final sorting algorithm has a greater complexity level than an optimal one (e.g., "quick sort"). The reason why even a non-optimal sorting algorithm (i.e., from the complexity point of view), has been selected, is that when sorting a smaller data set (up to 64 rows) the asymptotic complexity level does not matter that much. It would matter though if the data samples for sorting would be large ones. Due to this fact, the most suitable and performing sorting has been selected, which belongs to the "net sort" type. This type could not be used for large sample sorting due to its worse complexity characteristics and worse performance tasks on the data with large cardinality. However, it has been proven that on our smaller data set, the selected sorting ("net sort") algorithm turned out to be 10-15× faster than an optimal one (quick sort, from the complexity level point of view). This sorting technology is another core embodiment of the 2GA and it provides us with two main unique benefits: 10-15× faster than standard sorting algorithms; and designed to leverage the vectorization capabilities of current CPUs. Consequently, the elements from the "buff F" vector will be aggregated by the Consolidation algorithm (flowchart 1500, FIG. 5) in order of the "sorted idx" vector to the resulting "buff F" vector 1307.

Figure 6A:
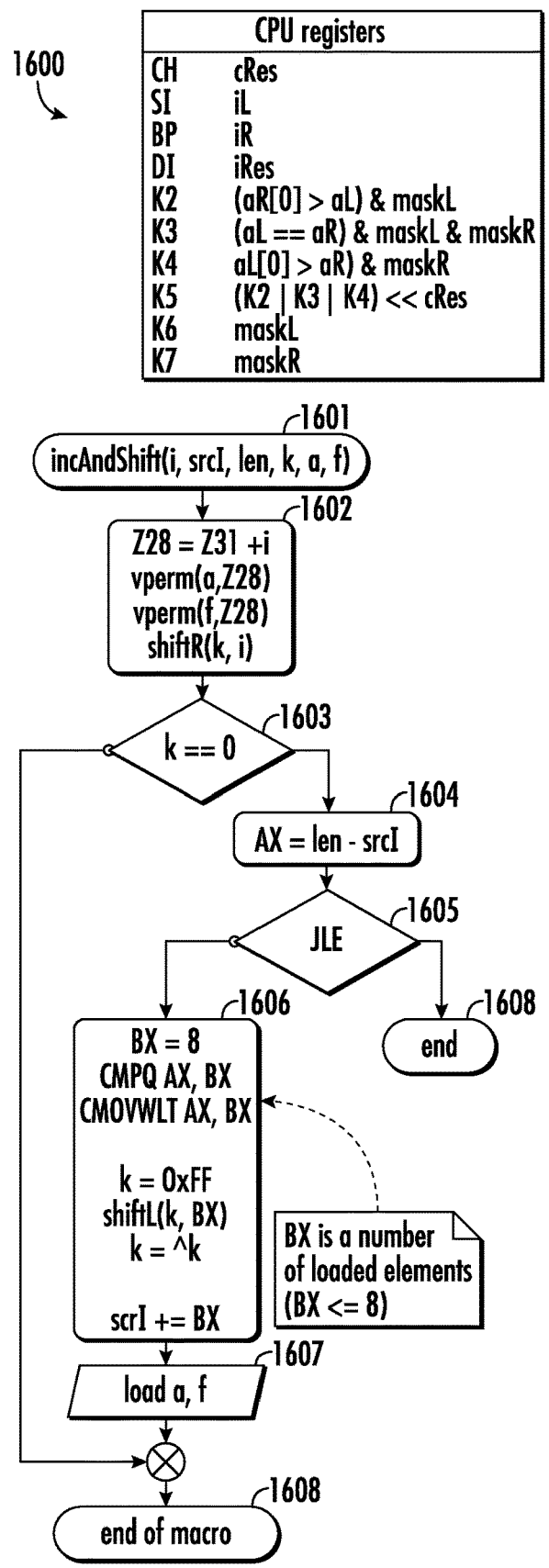
FIGS. 6A & 6B are flowcharts of the map-reduce algorithm, according to the present disclosure.
Figure 6B:
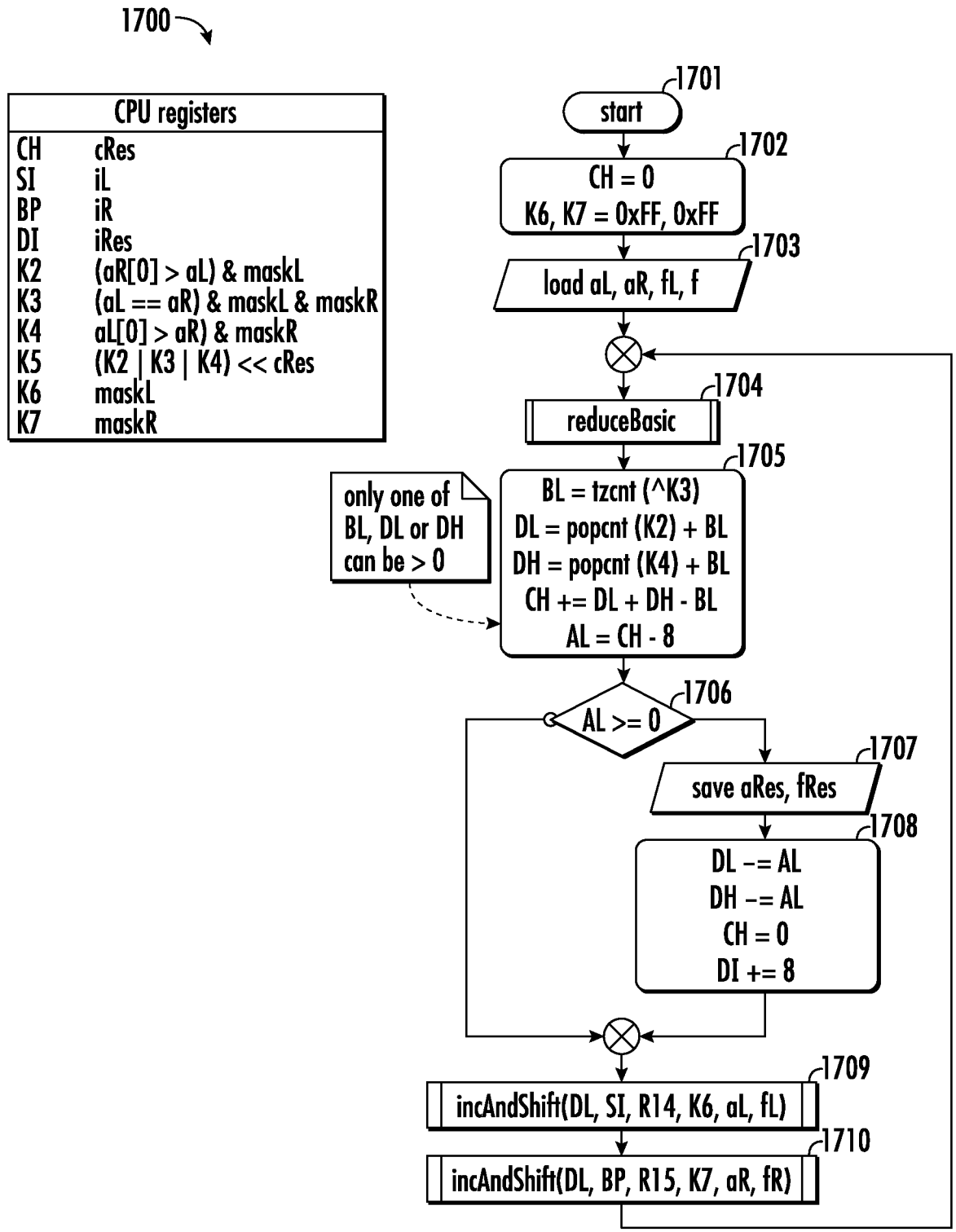

The result of the Map phase will be further aggregated by several Reduce phases (flowcharts 1600, 1700, FIGS. 6A-6B). The chunk of data is split into several distinct parts, each of which is processed by a cohort of "reduceSingleStep" procedures (See flowcharts 1800, 1900, FIGS. 7A-7B). The "reduceSingleStep" algorithm is implemented using SIMD operations. The simplified version of the vector operations dependencies is shown in diagram 2000 of FIG. 8. The algorithm is based on parallel speculative preparation of the fact value vectors $z28$ and $z29$, containing values for every relation that is part of input atomic data attributes. The result of attribute value comparison is stored to mask vectors $k2$ and $k3$ (can be also computed in parallel to the above-mentioned vectors $z28$ and $z29$), which will be used for result computation using vector permutation operation.

In terms of coding, the concept of the micro just-in-time compilation (µJIT) is utilized. The GO language has been used to program a special compiler intended to compile small chunks of the code, implementing critical vector based parts of the Reduce algorithm. Such vector Assembler routines are embedded into master standard procedural GO code. This approach provides significantly faster compilation than the compilation of the whole OpenCL procedure described in the '853 patent.

Figure 1B:
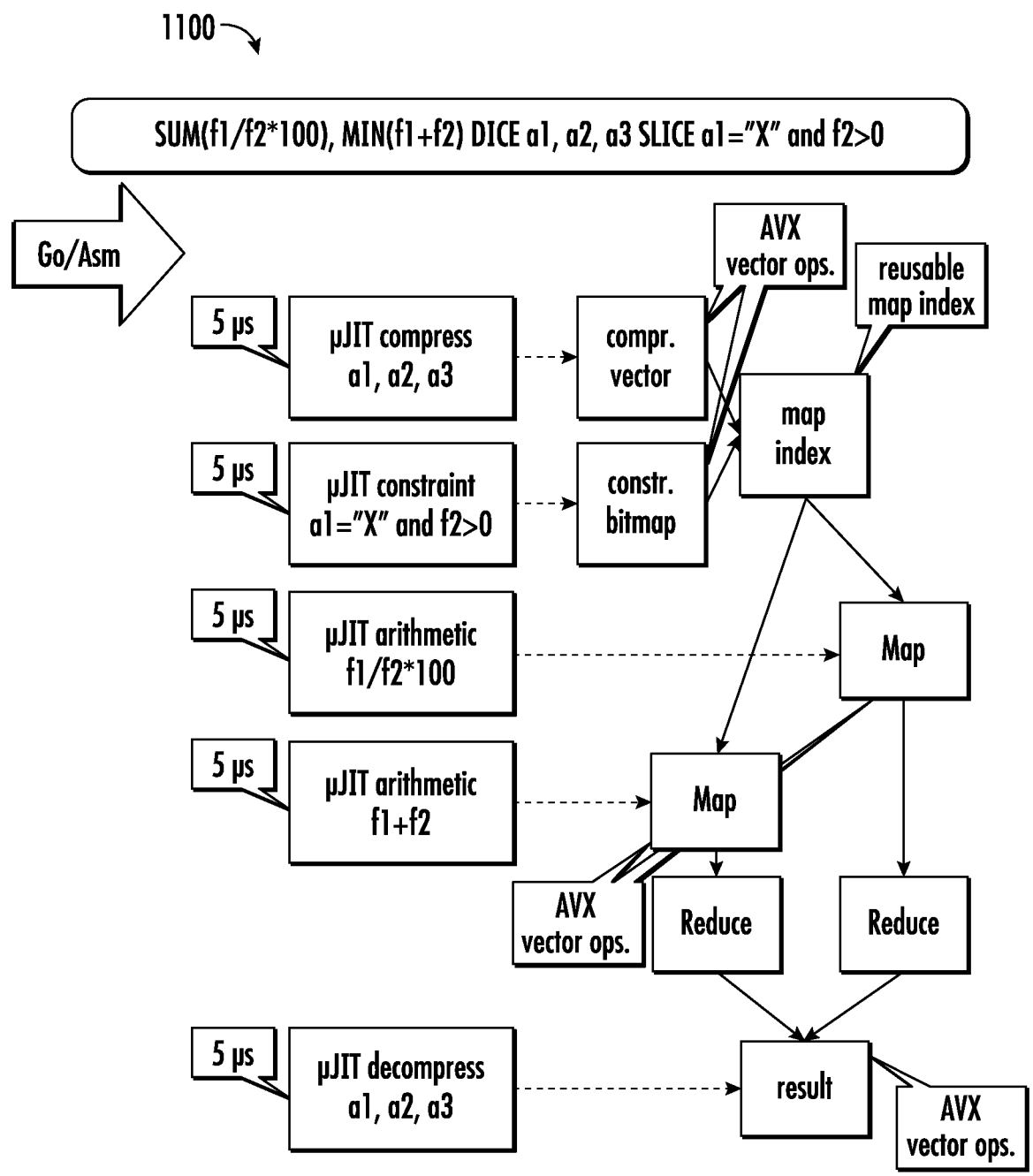
FIG. 1B is a schematic diagram of an aggregation engine, according to the present disclosure.

FIGS. 1A-1B include diagrams 1000, 1100, which show a high level comparison of the '853 patent engine and the 2GAE illustrated in one analytical example specified by the Analytical Query Engine definition. This scheme indicates how much faster the Just-In-Time compilation is with Assembler as opposed to OpenCL technology. The Go/ASM/AVX section also illustrates which modules take technology advantage of vectorization.

FIG. 2 includes a diagram 1200 with the structure of the data repository according to the teachings of the prior art invention with annotations. The dashed box indicates the portion that can be omitted using the present disclosure. The remaining portions are subject to redesign and additional optimization. A new implementation is optimized and enhanced by the following new features: design of a new net sorting algorithm (as described above); optimized utilization of CPU caches; and removing eight process levels in reduce phase, replacing OpenCl based coded threads with the one coded in GO language with embedded Assembler routines to leverage vectorization capabilities of the current CPUs.

Figure 5:
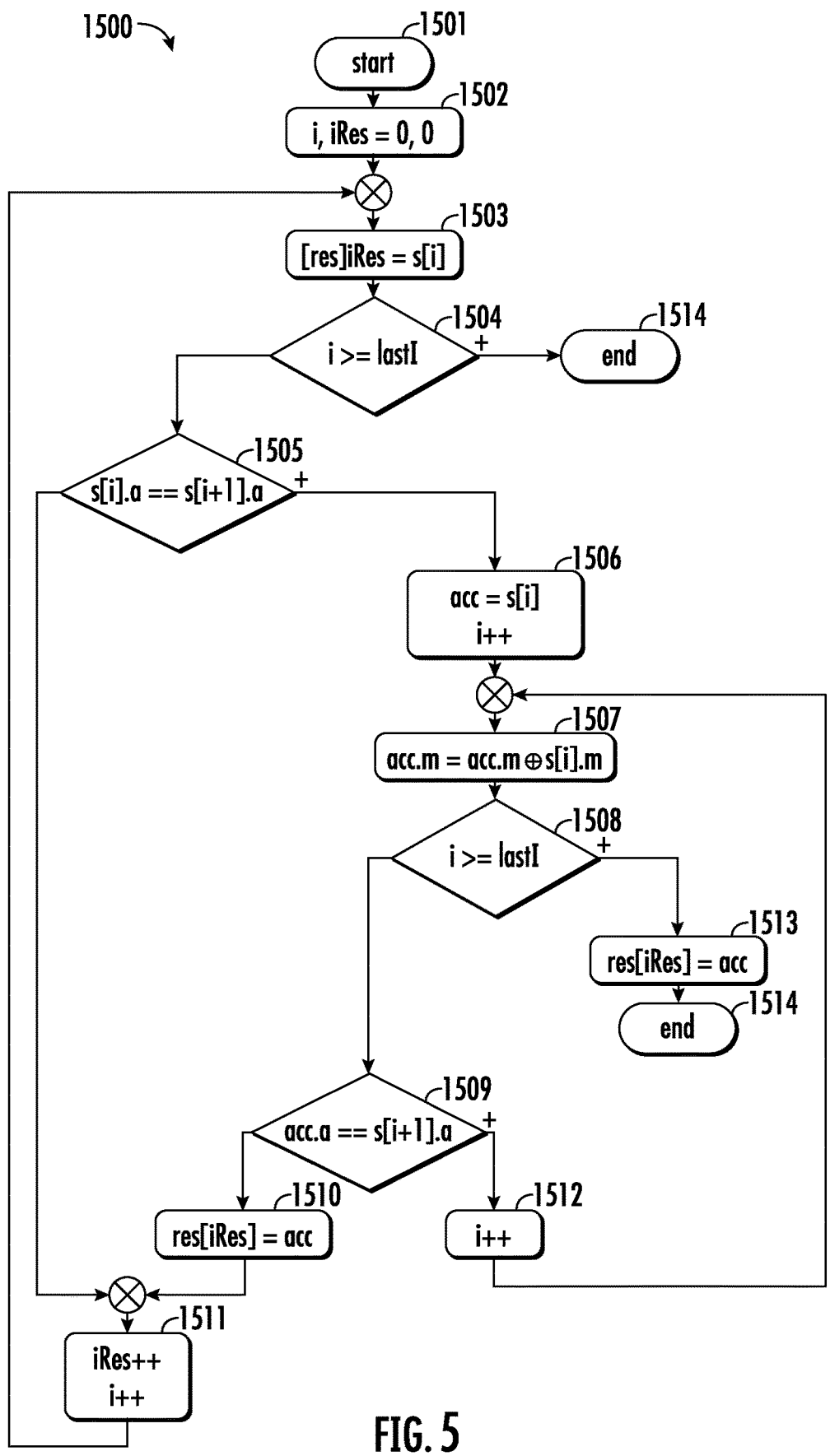
FIG. 5 is a flowchart of the map consolidation algorithm, according to the present disclosure.

FIG. 3 includes a diagram 1300 showing the example of the Map algorithm for illustration of the algorithms described in FIGS. 3 & 5. The "constr" data buffer 1301 contains a vector of Booleans defining the result of the constraint applied to the input data chunk. The "buff A" 1302 is the data buffer of the attribute data. The "buff F" 1303 is the data buffer of the fact data. The "idx" buffer 1304 contains indexes of the "constr" elements containing true values (i.e., 1). The "buff F" 1303 is the data buffer of the fact data. The "sorted idx" buffer 1305 contains indexes sorted by attribute buffer, used by consolidation algorithm to produce resulting attribute buffer "buff A" 1306 and fact buffer "buff F" 1307.

FIG. 4 includes a flowchart 1400 showing the map algorithm flow diagram shows the Map algorithm's application to the structure of the source data, containing the data buffer of the attribute data and the fact data, which begins at Block 1401. The total input data buffer is named piddle for reference here, and it is split into several data chunks, which will be processed by the Map algorithm separately. The index referencing the data chunk sorted by attribute buffer, using the sort network algorithm for efficiency, is created for each data chunk. (Blocks 1402-1409). The data chunk will be consolidated by the algorithm shown in FIG. 5.

FIG. 5 includes a flowchart 1500 for the map consolidation algorithm flow diagram, which consolidates the data chunk, which begins at Block 1501. This algorithm accesses data chunks (consisting of attribute and metric data vectors) by index referencing data sorted by attribute. Here "i" represents an index pointing to a processed element of the source data vector; "iRes" represents an index pointing to a resulting data vector; "lastI" is a parameter specifying the length of the source data chunk; "acc" is the accumulator to store aggregated data (consisting of "acc.a" to store compressed attribute tuple and "acc.m" to store metric element). The character @ shows the generic aggregation function, which a specific operation will substitute according to the required aggregation function (e.g., addition for SUM aggregation function). (Blocks 1502-1514).

FIGS. 6A-6B include flowcharts 1600, 1700, which show the reduce algorithm flow diagram on the level of the CPU registers. Each Reduce phase is applied to two data buffers (herein described as "left" and "right" buffers) even prepared by the Map algorithm described above or by Reduce phase executed on the lower level of the reduction tree. The reduce-basic procedure is implemented by SIMD vector operations described herein in the flowchart 1900. The flowchart 1600 describes a macro "incAndShift" (Blocks 1601-1608) that is used in the flowchart 1700 (Blocks 1701-1710). The "CPU registers" table shows the assignment of the individual algorithm variables to the CPU registers: here "iL" represents an index pointing to a processed element of the left buffer; "iR" represents an index pointing to the processed element of the right buffer; "iRes" represents an index pointing to the resulting buffer; "aL" represents a compressed attribute tuple selected from the left buffer and "maskL" is a mask applied to the "aL"; "aR" represents a compressed attribute tuple selected from the right buffer and "maskR" is a mask applied to the "aR".

Figure 7A:
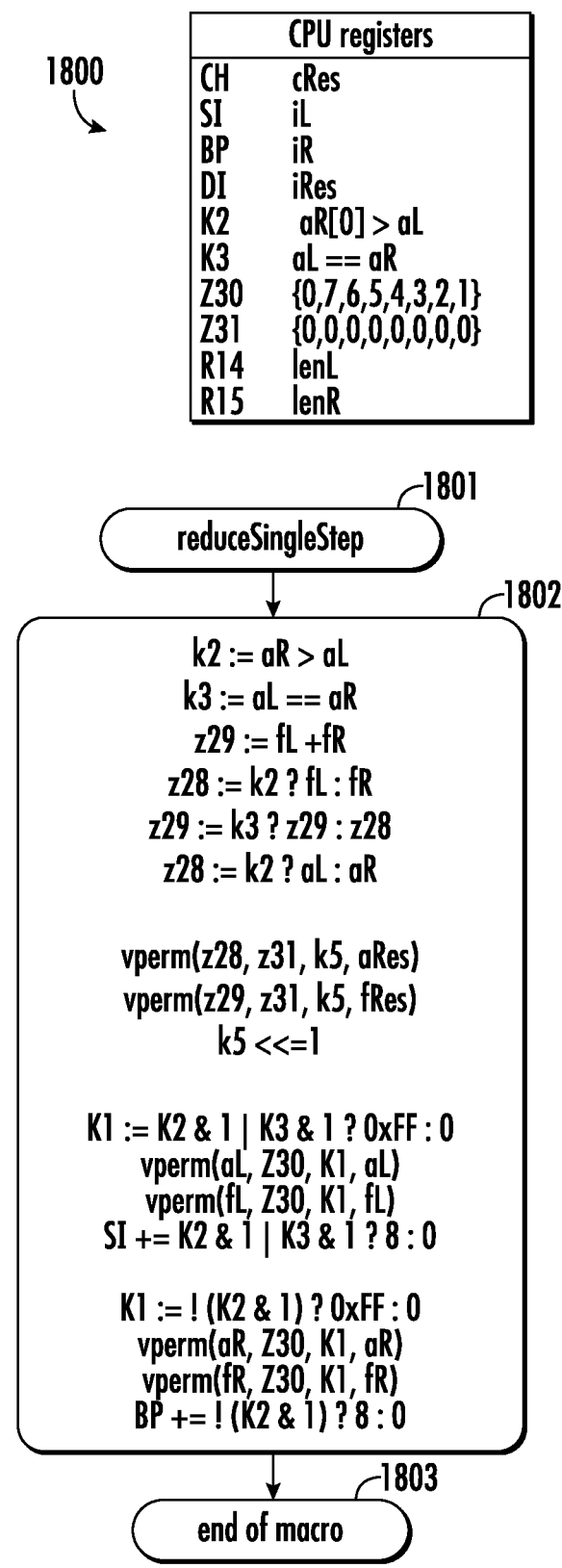
FIGS. 7A & 7B are flowcharts of the reduce-basic algorithm, according to the present disclosure.
Figure 7B:
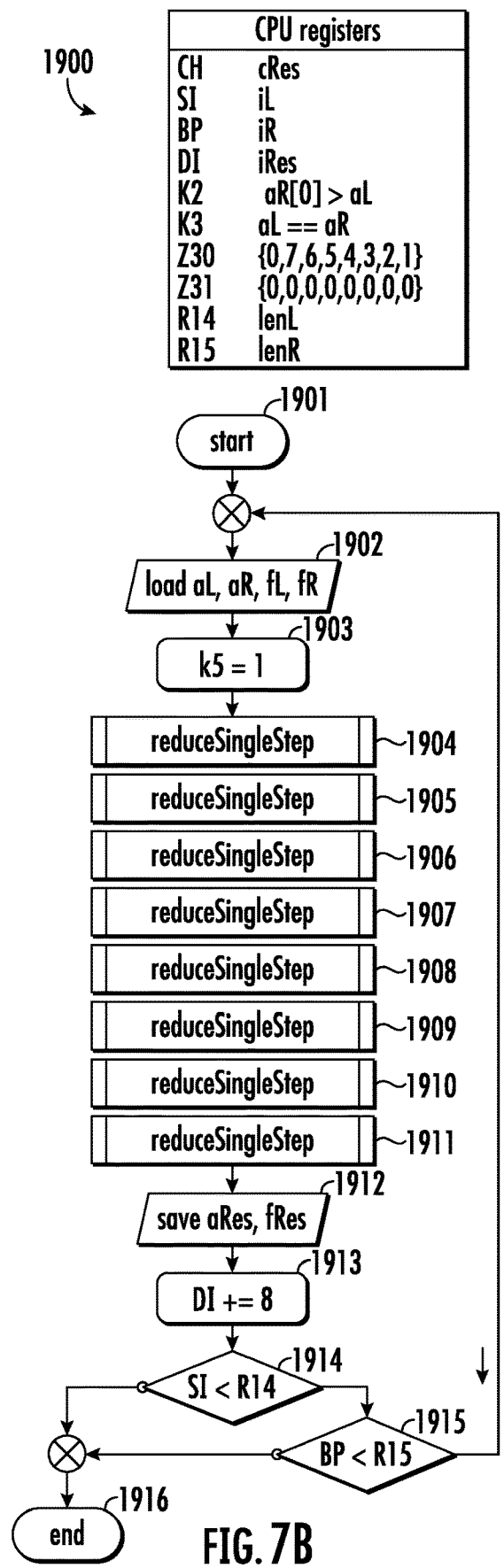

FIGS. 7A-7B include flowcharts 1800 (Blocks 1801-1803), 1900 (Blocks 1901-1916) for the reduce-basic algorithm flow diagram. This procedure invokes several "reduceSingleStep" operations described in flowchart 1800, which is implemented using SIMD vector operations described in detail in FIGS. 8-9. The "CPU registers" table shows the assignment of the individual algorithm variables to the CPU registers: here "iL" represents an index pointing to a processed element of the left buffer; "iR" represents an index pointing to the processed element of the right buffer; "iRes" represents an index pointing to the resulting buffer; "aL" represents a compressed attribute tuple selected from the left buffer and "maskL" is a mask applied to the "aL"; "aR" represents a compressed attribute tuple selected from the right buffer and "maskR" is a mask applied to the "aR"; "lenL" represents a length of the left buffer; "lenR" represents a length of the right buffer.

Figure 8:
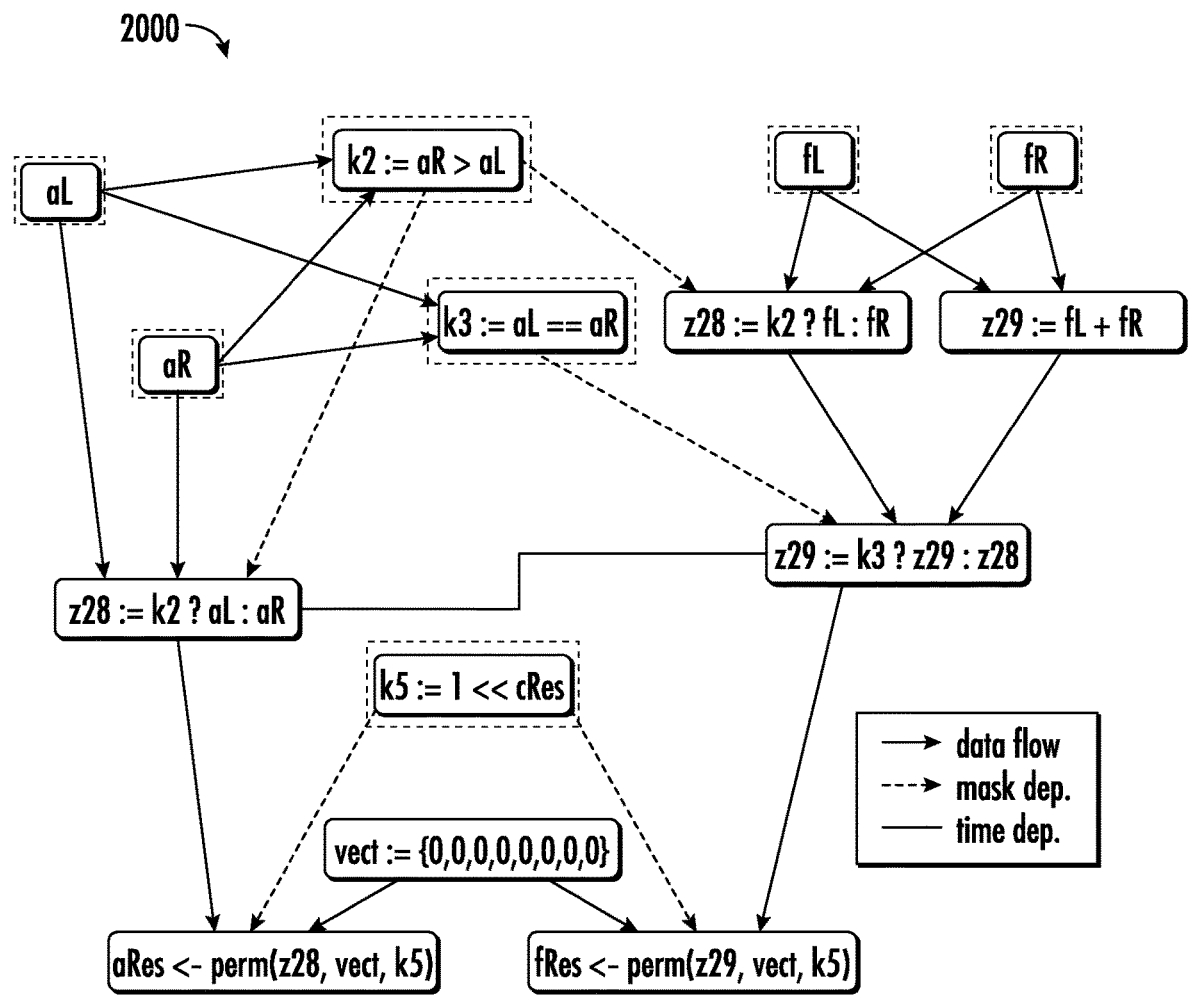
FIG. 8 is a schematic diagram of dependency of vector operations, according to the present disclosure.

FIG. 8 includes a diagram 2000 for a simplified dependency of the vector operations used for the implementation of the "reduceSingleStep" algorithm. The dashed boxes represent the vector data registers, and the long dashed boxes represent vector operations: here "aL" represents a compressed attribute tuple selected from the left buffer; "aR" represents a compressed attribute tuple selected from the right buffer; "fL" represents a metric element of the left buffer; "fR" represents a metric element of the right buffer; "k2", k3" and "k5" are mask registers. This simplified version of the dependency illustrates the basic principle of the vectorized reduction phase of the aggregation algorithm. The detailed optimized vector operations dependency diagram is shown in FIG. 9.

Figure 9:
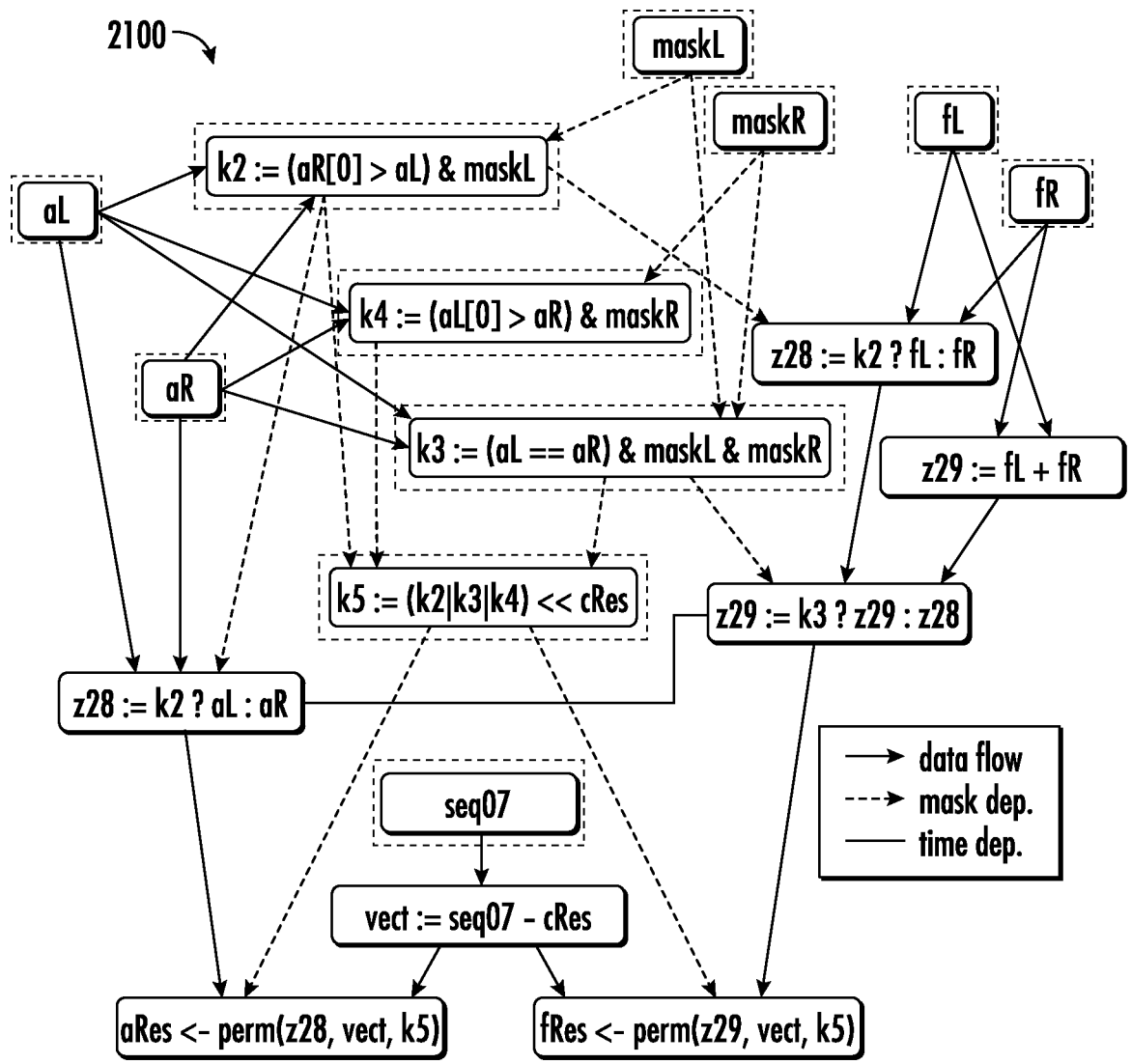
FIG. 9 is a schematic diagram of dependency optimized with the reduce-basic algorithm, according to the present disclosure.

FIG. 9 includes a diagram 2100 for the optimized dependency of the vector operations used for the implementation of the reduce-basic algorithm. The dashed boxes represent the vector data registers, and the long dashed boxes represent vector operations. The improvement using the "maskL" and "maskR" vector registers, which leads to better use of the vector processing unit: here "aL" represents a compressed attribute tuple selected from the left buffer and "maskL" is a mask applied to the "aL"; "aR" represents a compressed attribute tuple selected from the right buffer and "maskR" is a mask applied to the "aR"; "fL" represents a metric element of the left buffer; "fR" represents a metric element of the right buffer; "k2", k3", k4" and "k5" are mask registers.

Figure 10:
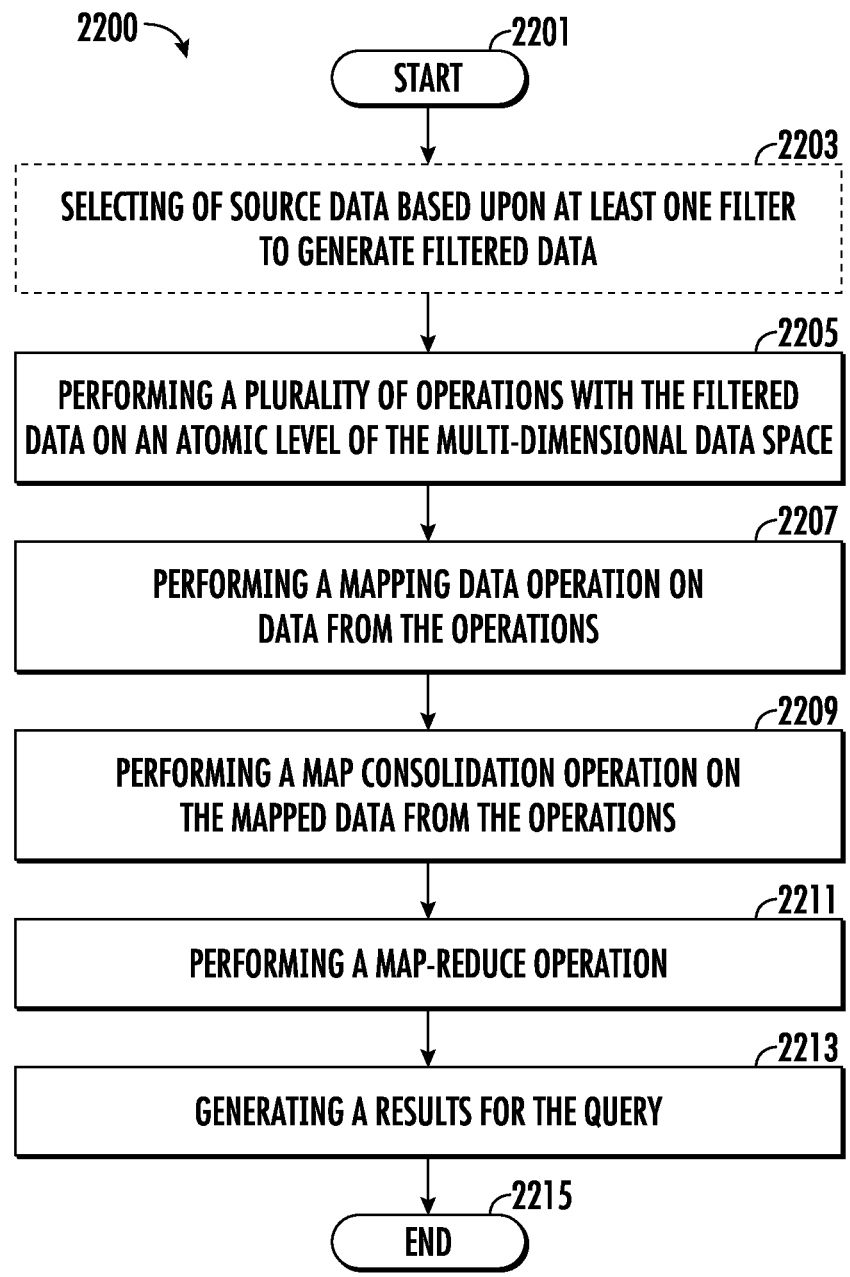
FIG. 10 is a flowchart of a method for executing a query in a multi-dimensional data space, according to the present disclosure.

Referring now to FIG. 10, a method for executing a query in a multi-dimensional data space is now described with reference to a flowchart 2200, which begins at Block 2201. The method comprises performing a plurality of operations with source data on an atomic level of the multi-dimensional data space (Block 2205), and performing a mapping data operation on data from the plurality of operations. (Block 2207). The method further comprises performing a map consolidation operation on the mapped data from the plurality of operations. (Block 2209). The method also includes performing a map-reduce operation on the mapped data from the plurality of operations. (Block 2211). The map-reduce operation comprises sequential vectorized operations. The method includes generating a result for the query based upon the sequential vectorized operations. (Blocks 2213, 2215).

In some embodiments, the sequential vectorized operations may comprise performing parallel speculative preparation of fact value vectors having values for every relation that is part of input atomic data attributes, and storing attribute value comparison in mask vectors. The map consolidation operation may comprise a sorting of the data from the plurality of operations.

Also, the sorting may comprise an aggregation of row based data using indices. The sorting may comprise processing a plurality of buffers. The plurality of buffers may comprise a constraint buffer, an attribute buffer, and a fact buffer.

The method may also include selecting the source data based upon at least one filter to generate filtered data. (Block 2203, noted with dashed lines). The mapping data operation may comprise dividing the data from the plurality of operations into a plurality of data chunks, and performing the mapping data operation on each of the plurality of data chunks. The mapping data operation, the map consolidation operation, and the map-reduce operation may be based upon just-in-time compilation, for example.

Figure 11:
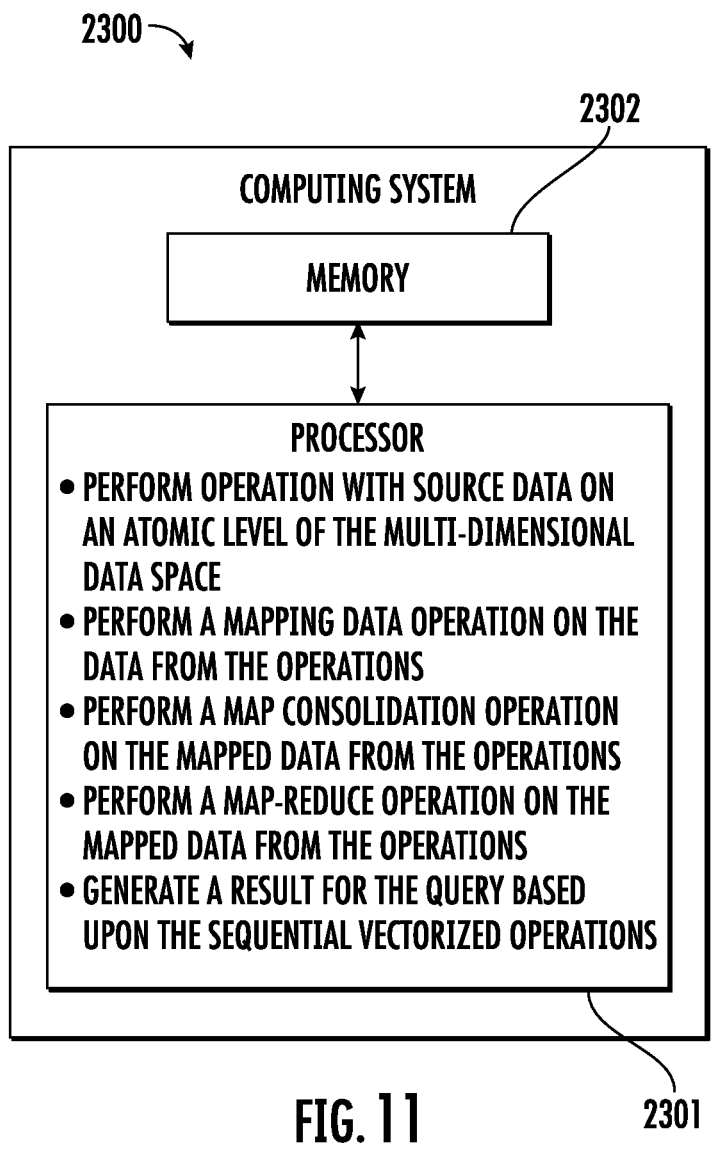
FIG. 11 is a schematic diagram of a computing system, according to the present disclosure.

Referring now to FIG. 11, a computing system 2300 according to the present disclosure is now described. The computing system 2300 is for performing a method for executing a query in a multi-dimensional data space. The computing system 2300 comprises a processor 2301 and memory 2302 coupled thereto and configured to perform a plurality of operations with source data on an atomic level of the multi-dimensional data space, and perform a mapping data operation on data from the plurality of operations. The processor 2301 is also configured to perform a map consolidation operation on the mapped data from the plurality of operations, perform a map-reduce operation on the mapped data from the plurality of operations. The map-reduce operation comprises sequential vectorized operations. The processor 2301 is also configured to generate a result for the query based upon the sequential vectorized operations.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A method for executing a query in a multi-dimensional data space, the method comprising:
performing a plurality of operations with source data on an atomic level of the multi-dimensional data space;
performing a mapping data operation on data from the plurality of operations;
performing a map consolidation operation on the mapped data from the plurality of operations;
performing a map-reduce operation on the mapped data from the plurality of operations, the map-reduce operation comprising sequential vectorized operations; and
generating a result for the query based upon the sequential vectorized operations.

2. The method of claim 1 wherein the sequential vectorized operations comprise:
performing parallel speculative preparation of fact value vectors having values for every relation that is part of input atomic data attributes; and
storing attribute value comparison in mask vectors.

3. The method of claim 1 wherein the map consolidation operation comprises a sorting of the data from the plurality of operations.

4. The method of claim 3 wherein the sorting comprises an aggregation of row based data using indices.

5. The method of claim 3 wherein the sorting comprises processing a plurality of buffers.

6. The method of claim 5 wherein the plurality of buffers comprises a constraint buffer, an attribute buffer, and a fact buffer.

7. The method of claim 1 further comprising selecting the source data based upon at least one filter to generate filtered data.

8. The method of claim 1 wherein the mapping data operation comprises dividing the data from the plurality of operations into a plurality of data chunks, and performing the mapping data operation on each of the plurality of data chunks.

9. The method of claim 1 wherein the mapping data operation, the map consolidation operation, and the map-reduce operation are based upon just-in-time compilation.

10. A method for executing a query in a multi-dimensional data space, the method comprising:
performing a plurality of operations with source data on an atomic level of the multi-dimensional data space;
performing a mapping data operation on data from the plurality of operations;
performing a map consolidation operation on the mapped data from the plurality of operations, the map consolidation operation comprising a sorting of the data from the plurality of operations;
performing a map-reduce operation on the mapped data from the plurality of operations, the map-reduce operation comprising sequential vectorized operations, the sequential vectorized operations comprising
performing parallel speculative preparation of fact value vectors having values for every relation that is part of input atomic data attributes, and
storing attribute value comparison in mask vectors; and
generating a result for the query based upon the sequential vectorized operations.

11. The method of claim 10 wherein the sorting comprises an aggregation of row based data using indices.

12. The method of claim 10 wherein the sorting comprises processing a plurality of buffers; and wherein the plurality of buffers comprises a constraint buffer, an attribute buffer, and a fact buffer.

13. The method of claim 10 further comprising selecting the source data based upon at least one filter to generate filtered data.

14. A computing system for performing a method for executing a query in a multi-dimensional data space, the computing system comprising:

a processor and memory coupled thereto and configured to perform a plurality of operations with source data on an atomic level of the multi-dimensional data space, perform a mapping data operation on data from the plurality of operations;

perform a map consolidation operation on the mapped data from the plurality of operations;

perform a map-reduce operation on the mapped data from the plurality of operations, the map-reduce operation comprising sequential vectorized operations, and generate a result for the query based upon the sequential vectorized operations.

15. The computing system of claim 14 wherein the sequential vectorized operations comprise:

performing parallel speculative preparation of fact value vectors having values for every relation that is part of input atomic data attributes; and storing attribute value comparison in mask vectors.

16. The computing system of claim 14 wherein the map consolidation operation comprises a sorting of the data from the plurality of operations.

17. The computing system of claim 16 wherein the sorting comprises an aggregation of row based data using indices.

18. The computing system of claim 16 wherein the sorting comprises processing a plurality of buffers.

19. The computing system of claim 18 wherein the plurality of buffers comprises a constraint buffer, an attribute buffer, and a fact buffer.

20. The computing system of claim 14 wherein the processor is configured to select the source data based upon at least one filter to generate filtered data.

* * * * *